United States Patent Office 3,044,802
Patented July 17, 1962

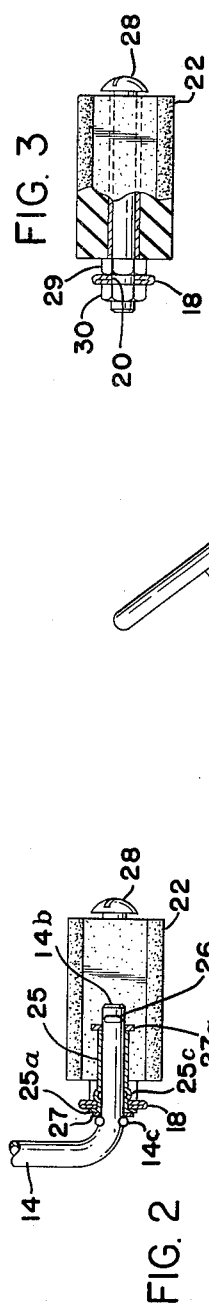

3,044,802
ADJUSTABLE PULL STRAP MECHANISM FOR JUVENILE VEHICLES AND THE LIKE
Alvin P. Douglas and Gilbert B. Hahn, Nashville, Tenn., assignors to The Murray Ohio Manufacturing Company, Nashville, Tenn., a corporation of Ohio
Filed Feb. 9, 1959, Ser. No. 791,941
2 Claims. (Cl. 280—256)

The present invention is generally concerned with a pull strap mechanism for juvenile vehicles or the like, and more particularly with such mechanism as is adjustable for accommodation to variable leg lengths among users of such vehicles.

Commercially produced juvenile pedal driven vehicles, such as juvenile autos and the like, in marketing encounter variations in the leg length of the contemplated users; and the market for such vehicles accordingly presents to the manufacturer a problem in providing ready adaptability of the product to each user with a minimum of variation in the manufacturing specifications; in other words, in meeting a popular demand by a standard model. Obviously it is desirable, for the manufacturer of vehicles of the type here of concern, that a single common type vehicle of standard parts be offered to the consuming public, whereby there is obviated any necessity of providing distinctly different parts for the accommodation of different physical structure, particularly different leg lengths in those expected to use the same. Accordingly, the main object of the present invention is then the provision of a single standard pedal-driven pull-strap mechanism for juvenile vehicles wherein it is possible to accommodate a broad range of physical size of the users.

In vehicles of the type here under consideration, a vehicle drive wheel is secured on a crank type driving axle usually with a pair of crank portions disposed 180° from each other; and longitudinally spaced on the vehicles from said driving axle there is mounted a pair of so-called pedal hanger elements, each having one end mounted on the vehicle frame for oscillation or pivoting about an axis transverse of the vehicle and its other end provided with a pedal mounting pivot portion also extending transverse of the vehicle. Pull straps extending generally lengthwise of the vehicle, each with opposite ends pivotally connected respectively to a corresponding crank portion of the axle and a pedal mounting portion of a hanger, convert to rotary motion in the drive axle, the oscillatory motion engendered by foot pressure applied alternately to the hanger.

Now since the arc of pedal motion of each hanger member and the seat portion of the vehicle have been relatively fixed in such prior structures, there has been accordingly no accommodation to various sizes or leg-lengths of the users.

The aforesaid broad general object is achieved in the present invention by divorcing the mounting of the individual pedal unit for each foot of the user from what has hitherto been termed the pedal hanger element.

The usual rotatable mounting of one end of a pull strap relative to a corresponding portion of the crank axle is maintained, but the mounting of the other end of the pull strap on one of said hangers, here designated a pull-strap hanger, is provided at a point axially or longitudinally fixed on the pull strap; and the pedal member as such for the pull strap is mounted thereon independently of the hanger member at a selectable position. By providing a plurality of apertures in the hanger end region of attachment of each pull strap, and use of a stud type pedal mounting, various attachment positions of the pedal element as such are available, and accordingly an adjustment for leg length.

Other objects and advantages of the invention will appear from the following description and the drawings wherein:

FIG. 1 is a side elevation of a juvenile vehicle involving the present invention, certain parts being broken away for clarity of representation;
FIG. 2 is a fragmentary view taken along the line 2—2 in FIG. 1; and
FIG. 3 is a fragmentary detailed view taken along the line 3—3 in FIG. 1.

In the drawings there is represented a pedal-driven, pull strap-driven, juvenile vehicle comprising a body B having front steering wheels and rear wheel of which at least one W is a driving wheel. Here the rear wheels are rotatably mounted with respect to the chassis or body B by a driving axle D. The driving axle, as well known in the prior art, includes two crank portions 10, 11 offset from each other in axially spaced relation on the length of the driving axle; and angularly offset from each other, by approximately 180°. In this vehicle, given by way of example, at the forward portion of the vehicle there are mounted two pull strap hanger members 13, 14 with upper ends pivotally secured to the body of the vehicle at 12 for oscillation or movement about a common axis at their upper end transverse to the vehicle.

Each hanger member has its respective upper and lower ends bent to right angles in directions opposite from each other in a common plane, and each hanger is connected, by a respective pull strap member 17, 18 extending longitudinally of the vehicle, to a corresponding crank portion of the rear or driving axle.

Each pull strap has its back end portion rotatably or pivotally secured on a respective crank portion of said drive axle if desired by suitable anti-friction bearings. As here shown the pull strap is a generally flat rigid piece of strap stock, disposed in a vertical plane longitudinal of the vehicle, with its forward end region provided with a series of longitudinally spaced transverse apertures 20, here shown as six in number. At its foremost aperture, each pull strap is pivotally secured on the lower end of the respective hanger member; that is, on the lower lateral offset portion of the hanger member, while a pedal member 22 is rotatably or pivotally mounted relative to the pull strap for rotation about an axis extending parallel the hanger pivot axis and to the lower lateral projection of the corresponding hanger member. The pedal member is secured in a selected one of the other apertures 20 of the pull strap, as here shown, in the second aperture from the front.

As shown in the detail of FIG. 2, for the connection of the hanger member 14 and the pull strap 18, and for stabilization of the pull strap, that is, to prevent lateral twisting of the same relative to the hanger member 14 or the crank axle, a transversely extended stabilizing sleeve 25 is secured in the front aperture of the pull strap as a journal tube for the hanger projection. As clearly appears in FIG. 2, the inner end of the sleeve 25 extended through the pull strap 18 has an end flange 25a and a circumferential ridge or bulge 25c embracing opposite sides of the pull strap to secure the sleeve thereon. The pull strap is located in fixed axial position on the hanger portion 14b between end washers 27, 27a respectively supported against rib formations 14c and cotter pin 26.

As shown more clearly in FIG. 3 for the left pedal structure, a pedal pad 22 is rotatably mounted on a bolt 28 between the bolt head and nut 29, and as an assembly is secured in selected position on the pull strap by insertion of the bolt end through an appropriate pull strap aperture and drawing up nut 30 to engage the strap between nuts 29 and 30. The pedal pad may as shown be comprised of a tough rubber-like material, or other material aptly formed. The longitudinal bolt receiving opening through the pad is preferably bushed as shown.

We claim:
1. In a pedal driven juvenile vehicle or the like, having a drive mechanism for vehicle propulsion including a drive wheel, a crank type drive axle for said wheel rotatably mounted to the vehicle, a hanger member longitudinally spaced from the axle having one end pivotally mounted to the vehicle about an axis transverse of the vehicle, a flat pull strap connecting the other end of said hanger member to a crank portion of said axle, opposite ends of said pull strap being rotatably mounted respectively on said hanger and said crank portion of said axle, that improvement comprising: said pull strap having a series of apertures spaced longitudinally from the hanger connected strap end, a pedal having a supporting bolt secured in one of said apertures, a journal tube extending through an opening formed in and rigidly fixed to the hanger-connected end of the pull strap, said hanger member having a lateral projection extending parallel to the axis of pivotal mounting of the hanger and through said tube to be journaled in the tube, said tube serving as a pull-strap stabilizing sleeve beam acting on said hanger projection whereby the pull strap is prevented from twisting relative to said projection when said pedal mounted on the pull strap intermediate the pivotally connected ends of the pull strap is subjected to vehicle propelling foot pressure; said journal tube having end-flanged and circumferential bulge formations on respective sides of and embracing the pull strap to firmly secure the tube therein.

2. In a pedal driven juvenile vehicle or the like, having a drive mechanism for vehicle propulsion including a drive wheel, a crank type drive axle for said wheel rotatably mounted to the vehicle, a hanger member longitudinally spaced from the axle having one end pivotally mounted to the vehicle about an axis transverse of the vehicle, a pull strap connecting the other end of said hanger member to a crank portion of said axle, opposite ends of said pull strap being rotatably mounted respectively on said hanger and said crank portion of said axle, that improvement comprising: said pull strap having a series of apertures spaced longitudinally from the hanger connected strap end, a pedal having a supporting bolt secured in one of said apertures, a journal tube extending through an opening formed in and rigidly fixed to the hanger-connected end of the pull strap, said hanger member having a lateral projection extending parallel to the axis of pivotal mounting of the hanger and through said tube to be journaled in the tube, said tube serving as a pull-strap stabilizing sleeve beam acting on said hanger projection whereby the pull strap is prevented from twisting relative to said projection when said pedal mounted on the pull strap intermediate the pivotally connected ends of the pull strap is subjected to vehicle propelling foot pressure; said lateral projection of the hanger member extending beyond one end of the journal tube, and means on the lateral projection at opposite ends of the tube for maintaining the tube and hanger projection in axially fixed but relative rotative relation.

References Cited in the file of this patent
UNITED STATES PATENTS

| | | |
|---|---|---|
| 1,424,497 | Verde et al. | Aug. 1, 1922 |
| 1,580,732 | Howe | Apr. 13, 1926 |
| 1,885,976 | Yandell | Nov. 1, 1932 |
| 2,172,811 | Snell | Sept. 12, 1939 |
| 2,633,371 | Douglas et al. | Mar. 31, 1953 |
| 2,723,132 | Oberwegner | Nov. 8, 1955 |
| 2,853,327 | Traugott | Sept. 23, 1958 |